United States Patent
Kubo et al.

(12)

(10) Patent No.: US 6,570,614 B1
(45) Date of Patent: May 27, 2003

(54) ELECTRONIC STILL CAMERA

(75) Inventors: Hiroaki Kubo, Muko (JP); Katsuyuki Nanba, Sakai (JP); Naohiro Kageyama, Sakai (JP); Takuya Kishimoto, Sakai (JP); Masayuki Funakoshi, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/041,047

(22) Filed: Mar. 6, 1998

(30) Foreign Application Priority Data

| Mar. 14, 1997 | (JP) | ............................................. 9-060911 |
| Mar. 14, 1997 | (JP) | ............................................. 9-060914 |
| Mar. 14, 1997 | (JP) | ............................................. 9-060916 |

(51) Int. Cl.[7] ................................................ H04N 5/76
(52) U.S. Cl. ................................................... 348/231.6
(58) Field of Search ............................... 348/207, 220, 348/222, 231, 232, 233, 239, 384, 390, 207.99, 220.1, 221.1, 222.1, 231.99, 231.6, 384.1, 390.1; H04N 5/225

(56) References Cited

U.S. PATENT DOCUMENTS 4,714,963 A * 12/1987 Vogel .......................... 348/220
4,827,347 A    5/1989 Bell
5,043,816 A    8/1991 Nakano et al.
5,828,406 A * 10/1998 Parulski et al. ............. 348/220
6,005,613 A * 12/1999 Endsley et al. ............. 348/231

FOREIGN PATENT DOCUMENTS

| JP | H2-172364 A | 7/1990 |
| JP | 3-213069 A  | 9/1991 |
| JP | 5-328279 A  | 12/1993 |
| JP | 08/191430   | 7/1996 |

* cited by examiner

Primary Examiner—Tuan Ho
(74) Attorney, Agent, or Firm—Sidley Austin Brown & Wood LLP

(57) ABSTRACT

An electronic still camera in which taken images are recorded onto a memory card has an LCD for image display, a RAM for image storage and a switch for image selection. Photographing is started before a direction to start recording is provided by the user. Photographing is continued even after the direction is provided and a predetermined number of images taken over a period spanning before and after the direction to start recording is provided are stored in the RAM. The images stored in the RAM are successively displayed on the LCD and the images which the user determines to be necessary and specifies by operating the switch are recorded onto the memory card.

35 Claims, 8 Drawing Sheets

ELECTRONIC STILL CAMERA

This application is based on applications Nos. H9-060911, H09-060914, and H9-060916 filed in Japan, the content of which is hereby incorporated by reference.

BACKGROUND OF THE INVENTION

1. Field of the Invention

The present invention relates to an electronic still camera, and more specifically, to an electronic still camera having a function to prevent the right moment to take a photo from being missed.

2. Description of the Prior Art

In order to prevent the right moment to take a photo (hereinafter, this moment will be referred to as "shutter chance") from being missed, an electronic still camera has been proposed which has a mode in which a plurality of images taken over a period spanning before and after the release operation is performed are recorded (hereinafter, this mode will be referred to as "shutter chance mode"). In the camera having this mode, an internal memory is provided for temporarily storing images therein and an operation as described below has conventionally been performed.

When placed in the shutter chance mode, the camera starts photographing and storage of taken images in the internal memory irrespective of whether the user of the camera performs the release operation or not. After the start of the storage, after a predetermined number of images have been stored, the oldest image is replaced by the latest image one after another. The camera continues the photographing and the storage until a predetermined number of images have been taken after the release operation is performed. Then, the camera reads out the images stored in the internal memory and records them onto a recording medium such as a memory card. As the recording medium, that of an external device such as a personal computer connected to the camera is sometimes employed.

By thus recording the images taken over a period spanning before and after the release operation, an image taken at a substantially optimum moment is included in images taken before the release operation when the release operation by the user is late for the shutter chance, and is included in images taken after the release operation when the release operation is performed too early. As a result, the possibility is greatly reduced that the shutter chance is missed.

Memory cards are widely used as a standard recording medium for electronic still cameras; they are removable, and come in various recording capacities. However, at present, even memory cards having largest capacities available can store several tens of images at most. On the other hand, recording media that are used as external devices for personal computers and the like have far larger capacities than memory cards, and therefore they can store a huge number of images. If one of such external devices is connected to a camera, there will be practically no limit in terms of recording capacity, and thus it will be possible to use the shutter chance mode frequently. Unnecessary images can be erased readily later.

However, in conventional cameras, the number of images that can be shot and stored in the shutter chance mode is fixed regardless of the recording medium used. As a result, when the number of images that can be stored is set according to the capacity of a large-capacity recording medium, only a limited number of scenes can be stored in a memory card, whereas, when the number is determined according to the capacity of the memory card, it is not possible to make the most of the capacity of the large-capacity recording medium.

Moreover, since all the images stored in the internal memory in the shutter chance mode are recorded onto the recording medium, unnecessary images as well as necessary images are stored in the recording medium. For this reason, the recording capacity of the recording medium is wastefully used, so that the number of scenes that can be recorded is small. While the use of a large-capacity recording medium enables photographing of many scenes, this does not provide essential avoidance of waste of the recording capacity.

Since recording media for electronic still cameras are rewritable, it is a way of avoiding the waste of recording capacity to reproduce all of the recorded images when all the recording capacity of the recording medium has been used, determine the necessity of each image and erase the unnecessary images. However, according to this method, when all the recording capacity has been used after the erasure of the unnecessary images, it is necessitated to determine the necessity of all the images including the images that were not erased in the previous determination, so that the determination is performed a plurality of times for the same images. This is inconvenient.

In conventional cameras, the shutter chance mode simply repeats shooting at equal time intervals, and therefore, in cases where the object is moving quickly, there is, even in the shutter chance mode, a possibility that the best shutter chance is missed. Some cameras are provided with different modes such as a "normal mode" for shooting a stationary or slowly moving object and a "sports mode" for shooting a quickly moving object so that an appropriate mode can be selected at least for single-shot shooting. Even in such cameras, however, no consideration is given, in the shutter chance mode, to the speed of the object's motion.

SUMMARY OF THE INVENTION

An object of the present invention is to provide an electronic still camera that, even in the shutter chance mode, can store a number of scenes in a recording medium having a relatively small capacity and can make the most of a recording medium having a relatively large capacity.

Another object of the present invention is to provide an electronic still camera wherein, of the images taken in the shutter chance mode, only necessary images are recorded onto a recording medium.

Still another object of the present invention is to provide an electronic still camera that can shoot even a quickly moving object surely without missing a shutter chance.

To achieve the above object, according to one aspect of the present invention, an electronic still camera is provided with an imaging apparatus for photographing a subject and generating image data of the subject; an operation member for providing a direction to start photographing; a first memory for storing therein image data of an image taken by the imaging apparatus; a selector for selecting any one of image data of a plurality of frames stored in the first memory; a second memory for storing therein image data of an image frame selected by the selector; and a controller for executing a pre-photographing control in which prior to the direction to start photographing provided by the operation member, the imaging apparatus is caused to photograph the subject and image data are stored in the first memory, and a post-photographing control in which in response to the direction to start photographing provided by the operation member, the imaging apparatus is caused to photograph the subject and image data are stored in the first memory. This electronic still camera is so designed that the selector selects any one of images of a plurality of frames taken through the pre-photographing control and the post-photographing control executed by the controller.

According to another aspect of the present invention, an electronic still camera is provided with an imaging apparatus for photographing a subject and generating image data of the subject; an operation member for providing a direction to start photographing; a memory for storing therein image data of an image taken by the imaging apparatus; and a controller for executing a pre-photographing control in which prior to the direction to start photographing provided by the operation member, the imaging apparatus is caused to repeatedly photograph the subject in a predetermined photographic cycle and image data are stored in the memory, and a post-photographing control in which in response to the direction to start photographing provided by the operation member, the imaging apparatus is caused to photograph the subject and image data are stored. This electronic still camera is designed to be capable of photographing in a plurality of photographic modes, and is so designed that the cycle is set in accordance with a selected photographic mode.

According to another aspect of the present invention, an electronic still camera is provided with an imaging apparatus for photographing a subject and generating image data of the subject; an operation member for providing a direction to start photographing; a memory for storing therein image data of an image taken by the imaging apparatus; and a controller for causing the imaging apparatus to repeatedly perform photographing in a predetermined cycle over a predetermined photographic period spanning before and after the direction to start photographing is provided by the operation member. This electronic still camera is designed to be capable of photographing in a plurality of photographic modes, and is so designed that the cycle is set in accordance with a selected photographic mode.

According to another aspect of the present invention, an electronic still camera is provided with an imaging apparatus for photographing a subject and generating image data of the subject; an operation member for providing a direction to start photographing; a memory for storing therein image data of an image taken by the imaging apparatus; and a controller for executing a pre-photographing control in which prior to the direction to start photographing provided by the operation member, the imaging apparatus is caused to repeatedly photograph the subject and image data of a predetermined number of frames are stored in the memory, and a post-photographing control in which in response to the direction to start photographing provided by the operation member, the imaging apparatus is caused to photograph the subject and image data are stored. This electronic still camera is designed to be capable of photographing in a plurality of photographic modes, and is so designed that the predetermined number is set in accordance with a selected photographic mode.

According to a further aspect of the present invention, an electronic still camera is provided with an imaging apparatus for photographing a subject and generating image data of the subject; an operation member for providing a direction to start photographing; a memory for storing therein image data of an image taken by the imaging apparatus; and a controller for causing the imaging apparatus to repeatedly perform photographing over a predetermined photographing period spanning before and after the direction to start photographing is provided by the operation member, the controller storing image data of a predetermined number of frames in the memory. This electronic still camera is designed to be capable of photographing in a plurality of photographic modes, and is so designed that the predetermined number is set in accordance with a selected photographic mode.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
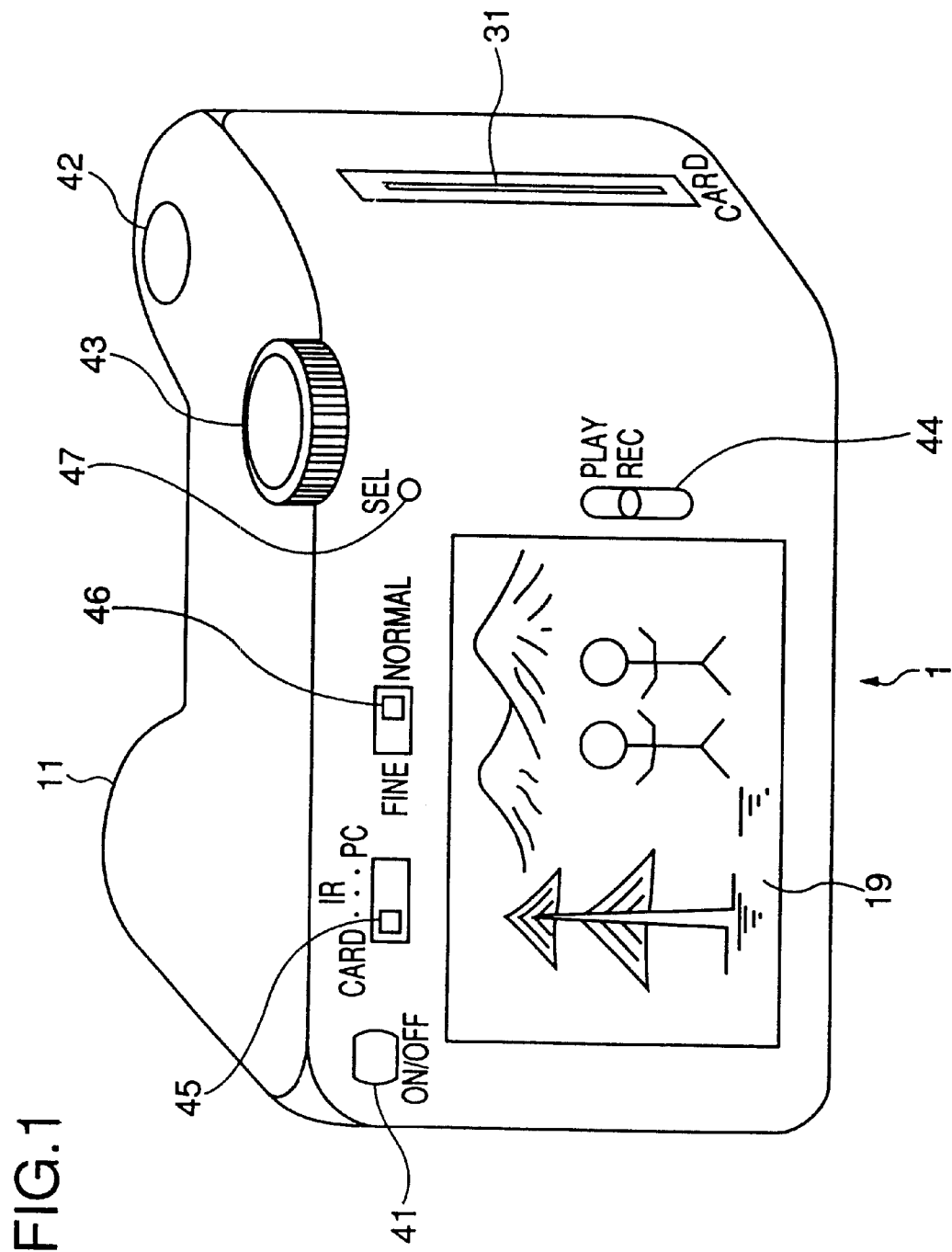
FIG. 1 is a perspective view showing the appearance of an electronic still camera according to an embodiment of the present invention.

Hereinafter, an embodiment of an electronic still camera employing the present invention will be described with reference to the drawings. FIG. 1 shows the appearance of an electronic still camera 1 (hereinafter, also referred to as mere camera) of this embodiment viewed obliquely from above from the rear. The camera 1 has a taking lens 11 on the front surface of the body, has a large-size color liquid crystal display (LCD) 19, a main switch (SM) 41, a photographing/reproduction changeover switch 44, a recording medium specifying switch 45, a compression rate changeover switch 46 and an image selecting switch 47 on the back surface, has a release button 42 and an operation mode setting switch 43 on the top surface and has a card slot 31 on a side surface.

Although not shown in the figure, a distance measurement window for measuring the distance to the subject, a photometric window for measuring the brightness of the subject and a communication window for performing data communication with another camera through infrared rays are provided on the front surface of the body and a connector for connection to an external apparatus such as a personal computer is provided on a side surface.

In the camera 1, light from the subject is imaged on a light receiving surface of a charged coupled device (CCD) by the taking lens 11 and photographing is electronically performed by the CCD. When the photographing/reproduction changeover switch 44 is set in the photographing position marked with "REC", photographing by the CCD is enabled and the taken images are displayed on the LCD 19.

The camera 1 records the taken images onto a recording medium. While a detachable/attachable memory card which is inserted into the camera through the card slot 31 is normally used as the recording medium, a recording medium may be used of an external apparatus connected to the camera 1 with or without a cable. The specification of the recording medium is performed by use of the recording medium specifying switch 45. The images to be recorded are compressed according to the procedure proposed by Joint Photographic image coding Experts Group (JPEG). In this example, the compression rate is selectable between two rates and the selection is made by use of the compression rate changeover switch 46.

When the photographing/reproduction switch 44 is set in the reproduction position marked with "PLAY", photographing is not performed but images recorded on the memory card are read out and displayed on the LCD 19. The displayed image is successively changed by operating the release button 42.

The release button 42 generates an S1ON signal for providing a direction to start photographing, distance measurement and photometry at a first stroke (half depression) and generates an S2ON signal for providing a direction to start recording of the taken images at a second stroke (full depression). During reproduction, the S2ON signal serves as a signal for providing a direction to change the displayed image.

The camera 1 has the following three recording modes: a single-exposure mode in which an image of one frame is recorded in response to one S2ON signal; a continuous-exposure mode in which images of a plurality of frames are continuously recorded while the S2ON signal is being generated; and the shutter chance mode for preventing the shutter chance from being missed. These modes are set by use of the operation mode setting switch 43. The shutter chance mode will be described in detail later.

The camera 1 also has the following three photographic modes: a macro mode suitable for photographing of a close subject; a portrait mode suitable for normal photographing such as photographing of a portrait; and a sport mode suitable for photographing of a fast moving subject. These modes are also set by use of the mode setting switch 43. The three recording modes and the three photographic modes can arbitrarily be combined.

Figure 2:
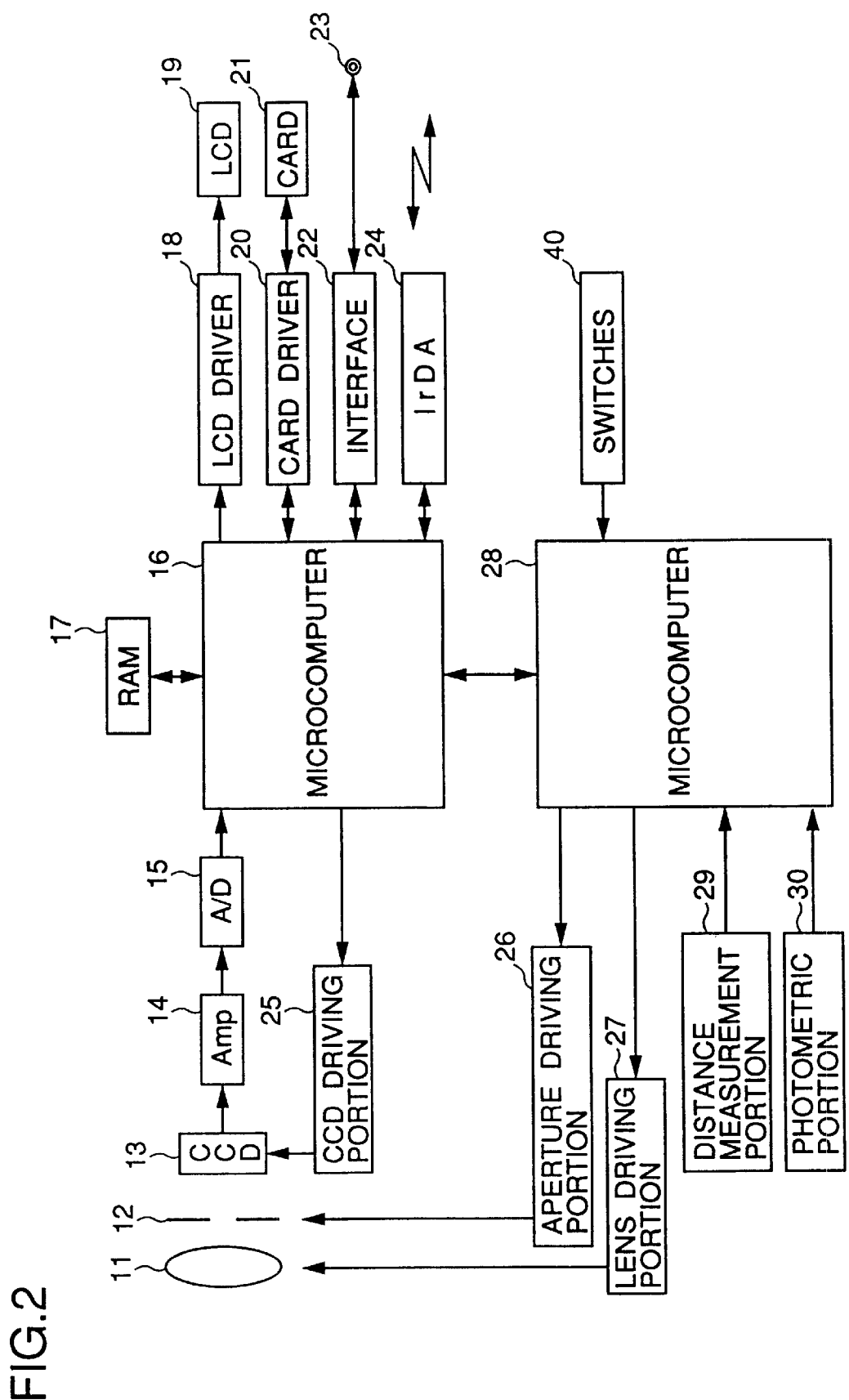
FIG. 2 is a block diagram showing a schematic construction of the electronic still camera.

A schematic construction of the camera 1 is shown in FIG. 2. The camera 1 has, for taking images, the taking lens 11, an aperture stop 12 for limiting the luminous flux having passed through the taking lens 11, a CCD 13 for receiving the light having passed through the aperture stop and outputting analog signals of three colors of red (R), green (G) and blue (B), an amplifier 14 for amplifying the output signals of the CCD, an analog-to-digital (A/D) converter 15 for converting the amplified analog signals into digital signals and a CCD driving circuit 25 for driving the CCD 13. The CCD driving circuit 25 directs each pixel of the CCD 13 to start photoelectric conversion and output the integrated charge.

The camera 1 has two microcomputers 16 and 28 for operation control. The first microcomputer 16, which is provided for performing all the processings related to image signals, controls photographing by the CCD 13 through the CCD driving circuit 25, and performs processings such as γ conversion, white balance conversion, interpolation of the three colors of R, G and B and conversion to a brightness/color difference signal on signals supplied from the A/D converter 15 and generates image signals that can be displayed.

To the microcomputer 16 are connected a random access memory (RAM) 17, an LCD driver 18, a card driver 20, an interface 22 and an infrared communication portion (IrDA) 24. The RAM 17 is an image memory used in the shutter chance mode and a plurality of images can be stored therein. The LCD driver 18 drives the LCD 19. The card driver 20 performs input and output to and from an attached memory card 21, i.e. performs reading and writing of image signals.

The interface 22 is provided for connection to an external apparatus, e.g. a personal computer, which handles images, so that the microcomputer 16 can exchange image data with the external apparatus connected through a connector 23. The IrDA 24 is provided for image data exchange with another electronic camera. If an external apparatus such as a personal computer has the IrDA, the microcomputer 16 can exchange image data with the external apparatus through infrared rays.

The second microcomputer 28 performs all the processings related to photographing except the processings related to image signals. To the microcomputer 28 are connected an aperture driving portion 26, a lens driving portion 27, a distance measurement portion 29, a photometric portion 30 and switches 40 such as the above-mentioned release switch 42. The first microcomputer 16 is also connected thereto.

The distance measurement portion 29 senses the distance to the subject by the phase difference detection method, and based on the output signal, the microcomputer 28 controls the lens driving portion 27 to thereby perform automatic focusing of the taking lens 11. The photometric portion 30 senses the brightness of the subject, and based on the output signal, the microcomputer 28 controls the aperture driving portion 26 to set the aperture stop 12 to thereby perform automatic exposure adjustment.

The microcomputer 28 also causes the microcomputer 16 to perform processing such as photographing by the CCD 13, image display on the LCD 19, compression of image signals, recording of image signals onto the memory card 21, transmission of image signals through the interface 22 or the IrDA 24 and readout of image signals from the memory card 21 at a predetermined timing based on a signal from the switches 40.

Figure 3:
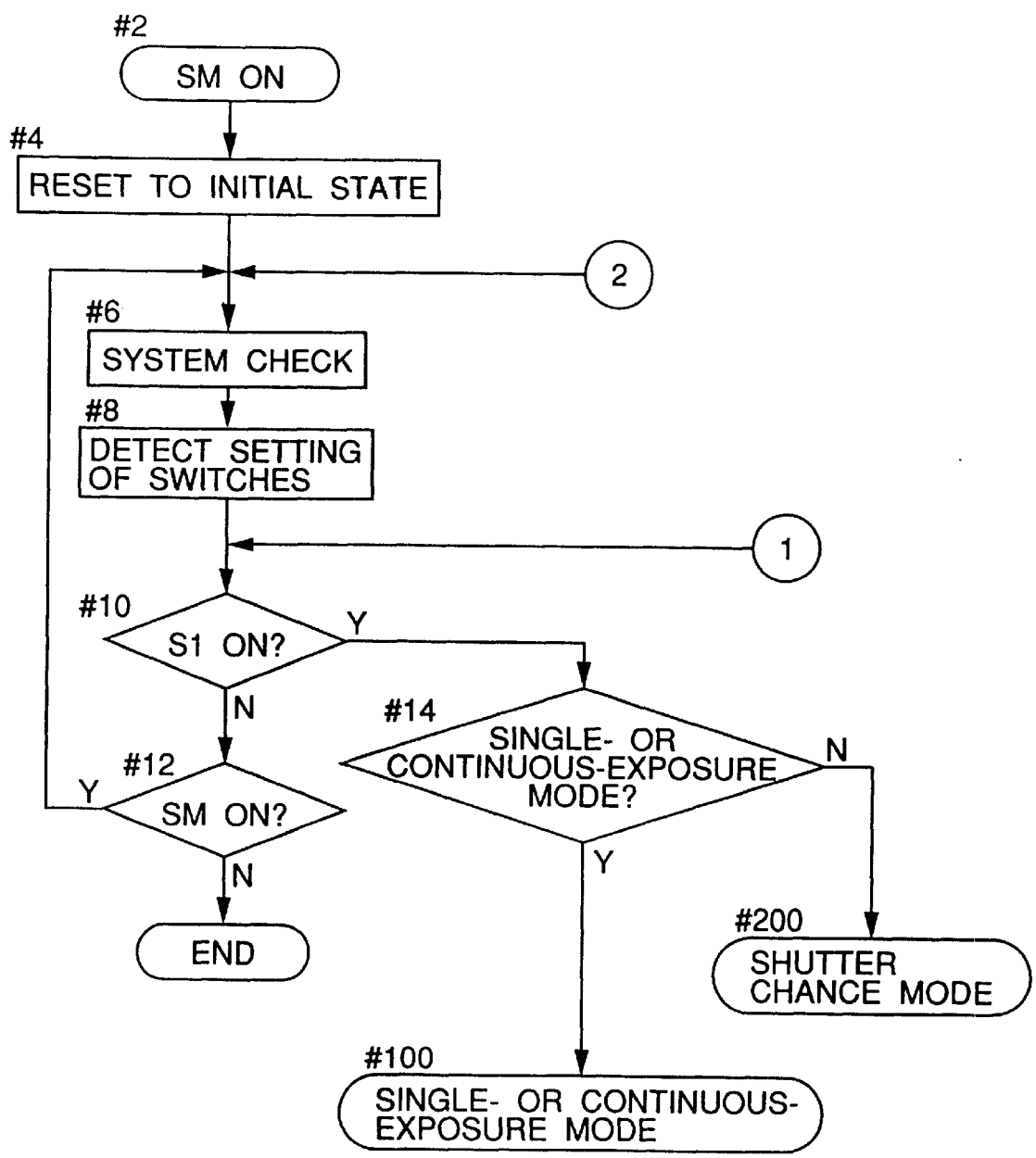
FIG. 3 is a flowchart showing a schematic flow of the entire photographing operation of the electronic still camera.

The flow of a photographing operation of the electronic still camera 1 having the above-described construction will be described with reference to flowcharts. FIG. 3 shows a schematic flow of the entire photographing operation from the activation to the stop of the camera. When the main switch (SM) 41 is operated to start power supply (step #2), first, the camera is reset to initial state (step #4) and system check is performed in which whether the memory card is inserted or not and the condition of connection to an external apparatus are determined (step #6). Then, the setting condition of the switches 40 is detected (step #8) and it is determined whether or not the S1ON signal has been generated in response to the first stroke of the release button 42 (step #10).

When the S1ON signal is absent, the setting condition of the main switch 41 is determined (step #12). When the main switch 41 is off, the process ends. When the main switch 41 is maintained on, the process returns to step #6 to repeat the system check and succeeding steps.

When the S1ON signal is present at the determination of step #10, which of the recording modes is set is determined based on the setting condition of the operation mode setting switch 43 (step #14). When the single-exposure mode or the continuous-exposure mode is set, the process proceeds to a photographic routine (step #100) for the single-exposure/continuous-exposure modes. When the shutter chance mode is set, the process proceeds to a photographic routine (step #200) for the shutter chance mode.

Figure 4:
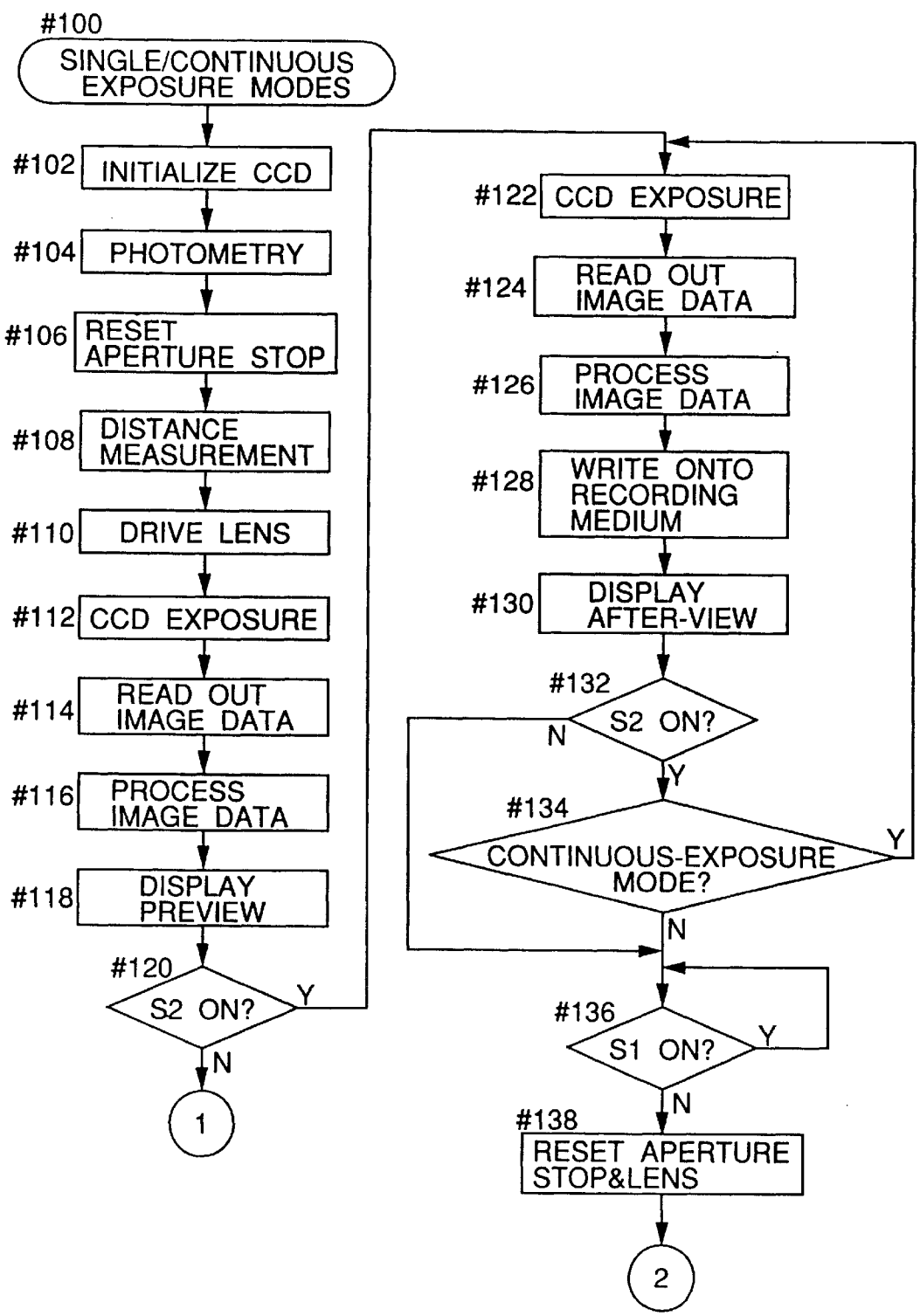
FIG. 4 is a flowchart showing the flow of a photographing operation in single-exposure/continuous-exposure modes of the electronic still camera.

FIG. 4 shows the photographic routine for the single-exposure/continuous-exposure modes. In these modes, first, the CCD 13 is initialized (step #102). Then, the brightness of the subject is measured by the photometric portion 30 (step #104) and based on the result of the photometry, the aperture stop 12 is set (step #106). Then, the distance to the subject is measured by the distance measurement portion 29 (step #108) and based on the result of the distance measurement, the taking lens 11 is driven to thereby perform focusing for the subject (step #110).

Then, the CCD 13 starts photoelectric conversion (step #112) and the integrated charge of the CCD 13 is outputted after a predetermined period of time has elapsed (step #114). The output signal is processed by the microcomputer 16 into an image signal that can be displayed (step #116) and the image signal is supplied to the LCD driver 18 so that the image is displayed on the LCD 19 (step #118). This image display provides a preview of the subject before the start of the recording.

Then, it is determined whether or not the S2ON signal for providing a direction to start the recording has been generated in response to the second stroke of the release button 42. When the S2ON signal is absent, the process returns to step #10 of FIG. 3 to determine the presence or absence of the S1ON signal. When the release button 42 is maintained half depressed, it is determined that the S1ON signal is present and in this case, the process again enters this routine to repeat the above-described steps, so that image taking and display are continued. Thus, when the release button 42 is half depressed, the LCD 19 functions as a finder.

When the S2ON signal is present at the determination of step #120, the photoelectric conversion and the output of the integrated charge by the CCD 13 are again performed (steps #122 and #124) and the output signal is processed by the microcomputer 16 (step #126). At this step, an image signal that can be displayed is generated and the generated image signal is compressed for recording. The compressed image signal is written onto a recording medium (step #128) and the image signal before compression is outputted to the LCD driver 18 so that the image is displayed on the LCD 19 (step #130). This image display provides an after view of the recorded subject.

The compression of the image signal at step #126 is performed according to the compression rate set by use of the compression rate changeover switch 46. While the recording of the image signal at step #128 is normally performed onto a memory card, the recording may be performed onto a recording medium of an external apparatus connected through an interface 22 instead of onto a memory card. Where the image signal is recorded is decided in compliance with the specification provided by use of the recording medium specifying switch 45.

After an image of one frame is recorded through the steps #122 to #130, the presence or absence of the S2ON signal is again determined (step #132). When the S2ON signal is present at this step, whether the continuous-exposure mode is set or not is determined (step #134). When the continuous-exposure mode is set, the process returns to step #122 to perform photographing, recording and display of the next image. Thus, when the continuous-exposure mode is set, images of a plurality of frames are recorded while the release button 42 is being fully depressed. By recording images onto a recording medium of an external apparatus, the limitation to the number of images taken in the continuous-exposure mode is reduced, so that continuous photography is facilitated.

When the S2ON signal is absent at the determination of step #132 and when the single-exposure mode is set at the determination of step #134, the process waits until the S1ON signal terminates (step #136). While the S1ON signal is present with the release button 42 being maintained half depressed, the display of the last recorded image is continued. Thereafter, the taking lens 11 and the aperture stop 12 are reset to initial state (step #138) and the process returns to step #6 of FIG. 3 to perform the system check and succeeding steps.

Photographing in the shutter chance mode will be described. In the shutter chance mode, photographing is started before the direction to start the image recording is provided by the S2ON signal, and is continued even after the direction to start the recording is provided so that a predetermined number of images taken over a period spanning before and after the direction to start the recording is provided are stored in the RAM 17. After photographing is finished, all the images stored in the RAM 17 are recorded onto a recording medium. The number of images stored in the RAM 17, i.e. the number of images recorded onto the recording medium and the photographic time interval are not fixed but are varied according to the setting of the photographic mode, etc.

Moreover, in this mode, image signals can be recorded not only onto either of the memory card 21 inserted in the camera 1 and a recording medium of an external apparatus such as a personal computer connected through the interface 22 but also onto both of the user's own memory card 21 and a memory card of another electronic camera by using both of them. In that case, the recording of image signals is performed, first, onto the user's own memory card 21 and after all the recording capacity thereof is used, recording is performed onto a memory card of another electronic camera. Transmission of image signals to the camera is performed by use of infrared rays.

Figure 5:
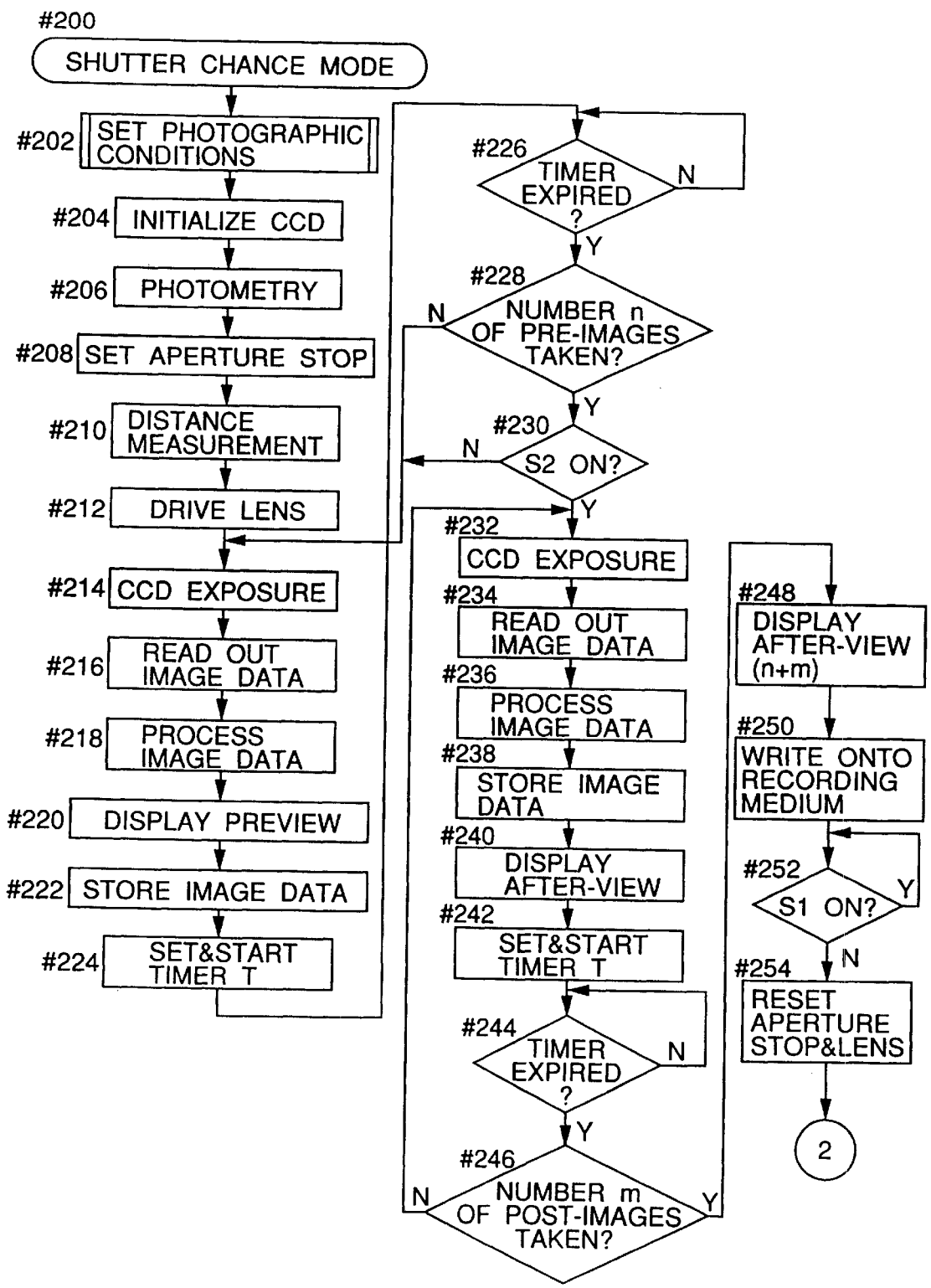
FIG. 5 is a flowchart showing the flow of a photographing operation in a shutter chance mode of the electronic still camera.

FIG. 5 shows the photographic routine for the shutter chance mode. First, photographic conditions in this mode are set, i.e. the number of images stored in the RAM 17 and the photographic time interval are set (step #202). The photographic conditions are set based on the compression rate, based on the photographic mode or based on the kind of the recording medium.

Figure 6:
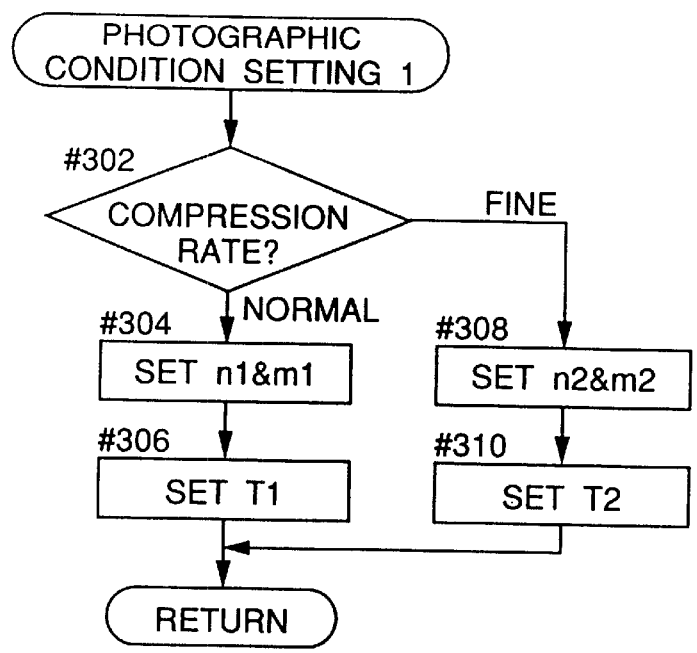
FIG. 6 is a flowchart showing the flow of photographic condition setting based on the compression rate in the shutter chance mode.

The routine of a first photographic condition setting based on the compression rate is shown in FIG. 6. First, the setting of the compression rate changeover switch 46 is checked to determine which of "normal" where the compression rate is high or "fine" where the compression rate is low is selected (step #302). Compressing images at high compression rate means that the number of image signals is smaller after compression. As the compression rate increases, the number of images that can be recorded onto a recording medium increases but the image quality degrades. In "normal", the image quality is normal and in "fine", the image quality is particularly high. The user usually selects "normal" where a multiplicity of images can be recorded.

When "normal" of high compression rate is selected, the number of images n before the direction to start the recording is provided (hereinafter, the number n will be referred to as pre-image number) is set to a predetermined value n1 (e.g. 5) and the number of images m after the direction to start the recording is provided (hereinafter, the number m will be referred to as post-image number) is set to a predetermined value m1 (e.g. 2) (step #304). Then, a photographic time interval T is set to a predetermined value T1 (e.g. 0.5 second) (step #306).

When "fine" of low compression rate is selected, the pre-image number n is set to a predetermined value n2 equal to or smaller than n1 (e.g. 3) and the post-image number m is set to a predetermined value m2 equal to or smaller than m1 (e.g. 1) (step #308), and the photographic time interval T is set to a predetermined value T2 equal to or greater than T1 (e.g. one second) (step #310).

The number of images (n+m) is set to a smaller value at low compression rate than at high compression rate in order that the recording capacity necessary for the recording of all the images is substantially the same between at high compression rate and at low compression rate. The photographic time interval T is set to a longer time at low compression rate than at high compression rate in order that the total length of time of photographing performed over a period spanning before and after the direction to start the recording is provided is substantially the same between at high compression rate and at low compression rate. With such setting, images taken in substantially the same period are recorded irrespective of the compression rate, so that the shutter chance is prevented from being missed because of the selection of the compression rate.

Figure 7:
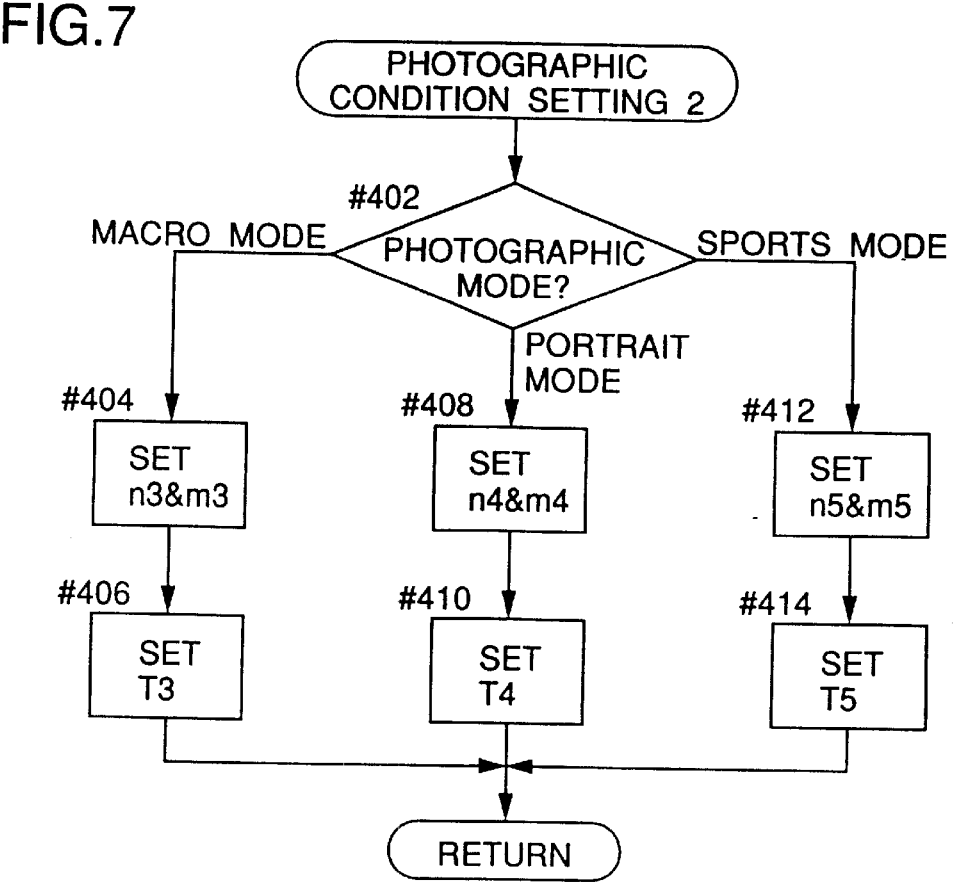
FIG. 7 is a flowchart showing the flow of photographic condition setting based on the photographic mode in the shutter chance mode.

The routine of a second photographic condition setting based on the photographic mode is shown in FIG. 7. First, the setting condition of the operation mode setting switch 43 is checked to determine which of the three photographic modes is selected (step #402).

When the macro mode suitable for photographing of a close subject is selected, the pre-image number n is set to a predetermined value n3 (e.g. 3) and the post-image number m is set to a predetermined value m3 (e.g. 1) (step #404), and the photographic time interval T is set to a predetermined value T3 (e.g. one second) (step # 406).

When the portrait mode suitable for normal photographing such as photographing of a portrait is selected, the pre-image number n is set to a predetermined value n4 (e.g. 5) equal to or greater than n3 and the post-image number m is set to a predetermined value m4 (e.g. 2) equal to or greater than m3 (step #408), and the photographic time interval T is set to a predetermined value T4 (e.g. 0.5 second) equal to or smaller than T3 (step #410).

When the sport mode suitable for photographing of a fast moving subject is selected, the pre-image number n is set to a predetermined value n5 (e.g. 7) equal to or greater than n4 and the post-image number m is set to a predetermined value m5 (e.g. 3) equal to or greater than m4 (step #412), and the photographic time interval T is set to a predetermined value T5 (e.g. 0.3 second) equal to or smaller than T4 (step #414).

In the above setting, the photographic time interval T decreases and the number of recorded images (n+m) increases in the order of the macro mode, the portrait mode and the sport mode in order to surely capture the shutter chance because the movement of the subject is considered to increase in this order, and in order to avoid unnecessarily large number of images being stored to complicate succeeding processing. The total length of time of photographing does not greatly differ among the photographic modes.

Figure 8:
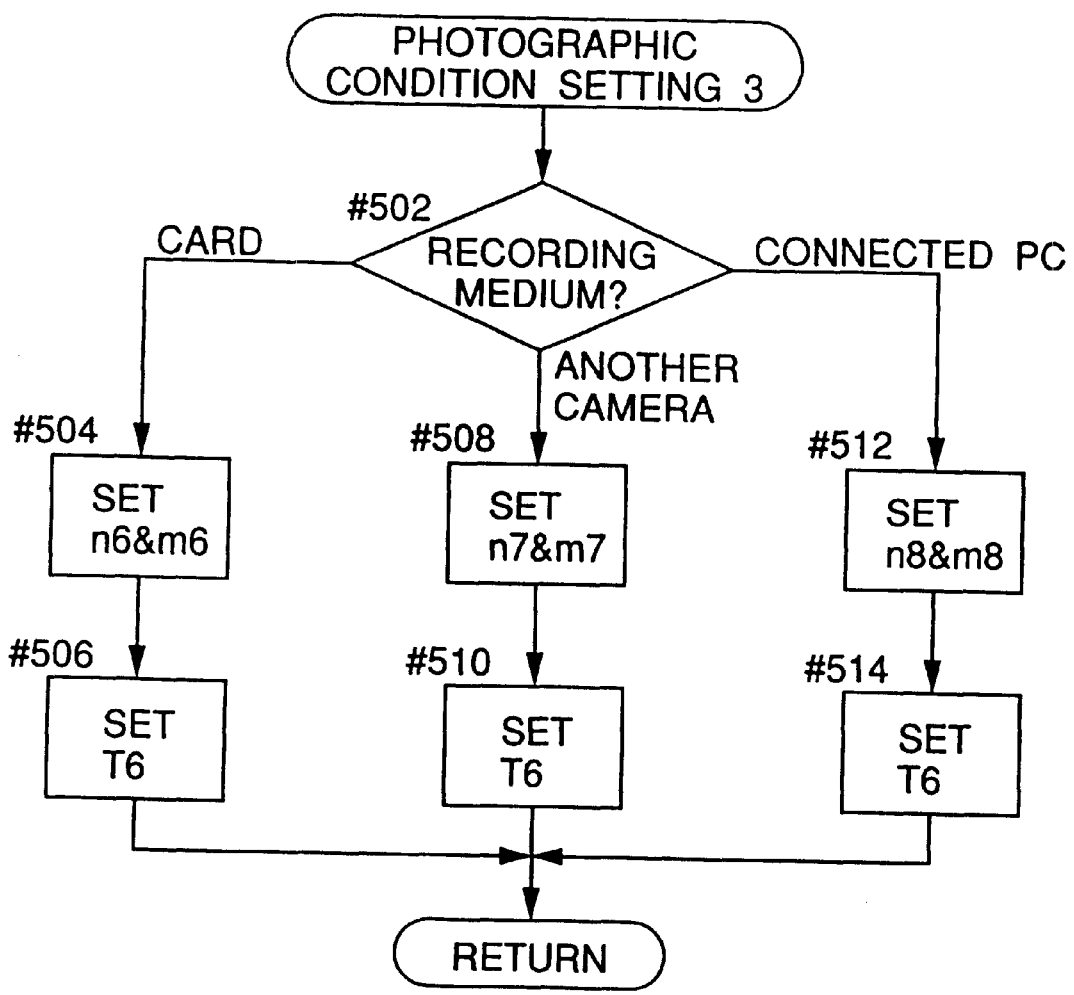
FIG. 8 is a flowchart showing the flow of photographic condition setting based on the kind of the recording medium in the shutter chance mode.

The routine of a third photographic condition setting based on the kind of the recording medium is shown in FIG. 8. First, the setting condition of the recording medium specifying switch 45 is checked to determine which of the following is selected: the recording onto the user's own memory card 21; the recording onto the user's own memory card and the memory card of another camera; and the recording onto the recording medium of an external apparatus (step #502).

When the recording onto the memory card 21 is selected, the pre-image number n is set to a predetermined value n6 (e.g. 5) and the post-image number m is set to a predetermined value m6 (e.g. 2) (step #504), and the photographic time interval T is set to a predetermined value T6 (e.g. 0.5 second) (step #506).

When the recording onto the memory card 21 and the memory card of another camera is selected, the pre-image number n is set to a predetermined value n7 (e.g. 7) equal to or greater than n6 and the post-image number m is set to a predetermined value m7 (e.g. 3) equal to or greater than m6 (step #508), and the photographic time interval T is set to the above-mentioned predetermined value T6 (step #510). Since the use of the memory card of another camera increases the recording capacity, the number of images (n+m) can be thus increased.

When the recording onto the recording medium of an external apparatus such as a personal computer is selected, the pre-image number n is set to a predetermined value n8 (e.g. 9) equal to or greater than n7 and the post-image number m is set to a predetermined value m8 (e.g. 4) equal to or greater than m7 (step #512), and the photographic time interval T is set to the above-mentioned predetermined value T6 (step #514). The reason why the number of images (n+m) is further increased is that the external apparatus such as a personal computer has a large-capacity recording medium and a greater number of images can be recorded.

The photographic time interval T is not necessarily varied among the recording media and is preferably the same like the above setting. In the camera 1, since the images taken in the shutter chance mode are temporarily stored in the RAM 17 and the images are later read out from the RAM 17 and recorded for storage, it is possible to set the photographic time interval the same. If each image is recorded immediately after being taken, the photographic time interval will be limited by the time necessary for transmission, particularly, by the transmission time when the communication speed is low, so that the photographic time interval cannot be the same.

While in this description, an example is shown in which the photographic condition setting based on the compression rate, that based on the photographic mode and that based on the kind of the recording medium are separately performed, they may be performed in combination. For example, when the recording capacity is sufficient by connecting an external apparatus, the number of recorded images can be increased even when a low compression rate is selected and when the photographing in the macro mode is selected, and the number of recorded images and the photographic time interval can be set in accordance with the photographic mode even when a high compression rate where the image quality is normal is selected.

While in the above-described photographic condition setting based on the kind of the recording medium, the number of recorded images (n+m) is set in consideration of the total recording capacity of the recording media, it may be set based on the remaining available recording capacity. Moreover, since the user's direction to start the recording tends to be late for the optimum moment and is rarely too early, the post-image number m may be fixed when the photographic mode is other than the sport mode.

Reverting to FIG. 5, the description of the flow of the photographing in the shutter chance mode will be continued. After the photographic conditions are set at step #202, the CCD 13 is initialized (step #204), the brightness of the subject is measured by the photometric portion 30 (step #206) and based on the result of the photometry, the aperture stop 12 is set (step #208). Then, the distance to the subject is measured by the distance measurement portion 29 (step #210) and based on the result of the distance measurement, the taking lens 11 is driven to thereby perform focusing for the subject (step #212).

Then, the CCD 13 starts photoelectric conversion (step #214) and the integrated charge of the CCD 13 is outputted after a predetermined period of time has elapsed (step #216). Then, the microcomputer 16 generates image signals that can be displayed and thinning out processing which precedes the compression processing is performed on the generated image signals (step #218). The thinning out is performed, for example, so that the extended graphics array (XGA) (1024×768 pixels) is reduced to the half size (512×384 pixels).

After the image signal processing, the image is displayed on the LCD 19 as the preview (step #220) and the thinned out image signals are stored in the RAM 17 (step #222). The amount of image signals is reduced by the thinning out, so that a greater number of images can be stored in the RAM 17.

Then, a timer is set for the photographic time interval T decided in the condition setting and is started (step #224) and the process waits until the timer expires (step #226). After the timer expires, it is determined whether or not the pre-image number n of images have been taken and stored (step #228). When the number of stored images has not reached the pre-image number n, the process returns to step #214 to repeat image taking and storage. When the number of stored images has reached the pre-image number n, whether the S2ON signal is present or not is determined (step #230).

When the S2ON signal is absent, the process returns to step #214 to repeat image taking and storage. At this time, the pre-image number n of images have already been stored in the RAM 17 and thereafter, the oldest image is erased when a new image is stored at step #222. Consequently, the pre-image number n of images in the RAM 17 are always updated until the S2ON signal is generated.

When the S2ON signal is present, the next image is taken (steps #232 and #234) and the generation and thinning out of image signals are performed (step #236). Then, the thinned out image signals are stored in the RAM 17 (step #236) and the image is displayed (step #240). This image display provides an after view of the subject photographed latest.

Then, the timer is again set for the photographic time interval T and is started (step #242) and the process waits until the timer expires (step #244). After the timer expires, it is determined whether or not the post-image number m of images have been taken and stored (step #246). When the number of images stored after the generation of the S2ON signal has not reached the post-image number m, the process returns to step #232 to repeat image taking and storage.

When the number of images stored after the generation of the S2ON signal has reached the post-image number m, the display screen of the LCD 19 is split and all of the (n+m) images stored in the RAM 17 are listed thereon as the after view (step #248). Then, the image signal of each image is coded and compressed at the selected compression rate and the compressed signal is recorded onto the selected recording medium (step #250).

After the recording of the images, the process waits until the S1ON signal terminates (step #252) and the taking lens 11 and the aperture stop 12 are reset to initial state (step #254). When the S1ON signal is present with the release button 42 being maintained half depressed, the display of all the images taken in the shutter chance mode is continued. Then, the process returns to step #6 of FIG. 3 to perform the system check and succeeding steps.

In the photographing in the shutter chance mode, since the number of recorded images is varied according to the compression rate, the photographic mode or the kind of the recording medium, the recording capacity is effectively used. Since images taken over substantially the same period of time are recorded even when the photographic time interval is varied according to the compression rate or the photographic mode, there is no possibility that the shutter chance is missed due to variation in the number of images.

Instead of recording all the images stored in the RAM 17 onto the recording medium, only the images selected by the user may be recorded onto the recording medium. Although similar images are taken in the shutter chance mode, the number of images taken at the optimum or nearly optimum moment is one, or approximately two at most. Therefore, if the image taken at the moment is recorded, the object of the photographing in this mode is achieved. Further, since unnecessary images are not recorded, more recording capacity is left, so that more images of other scenes can be recorded.

Figure 9:
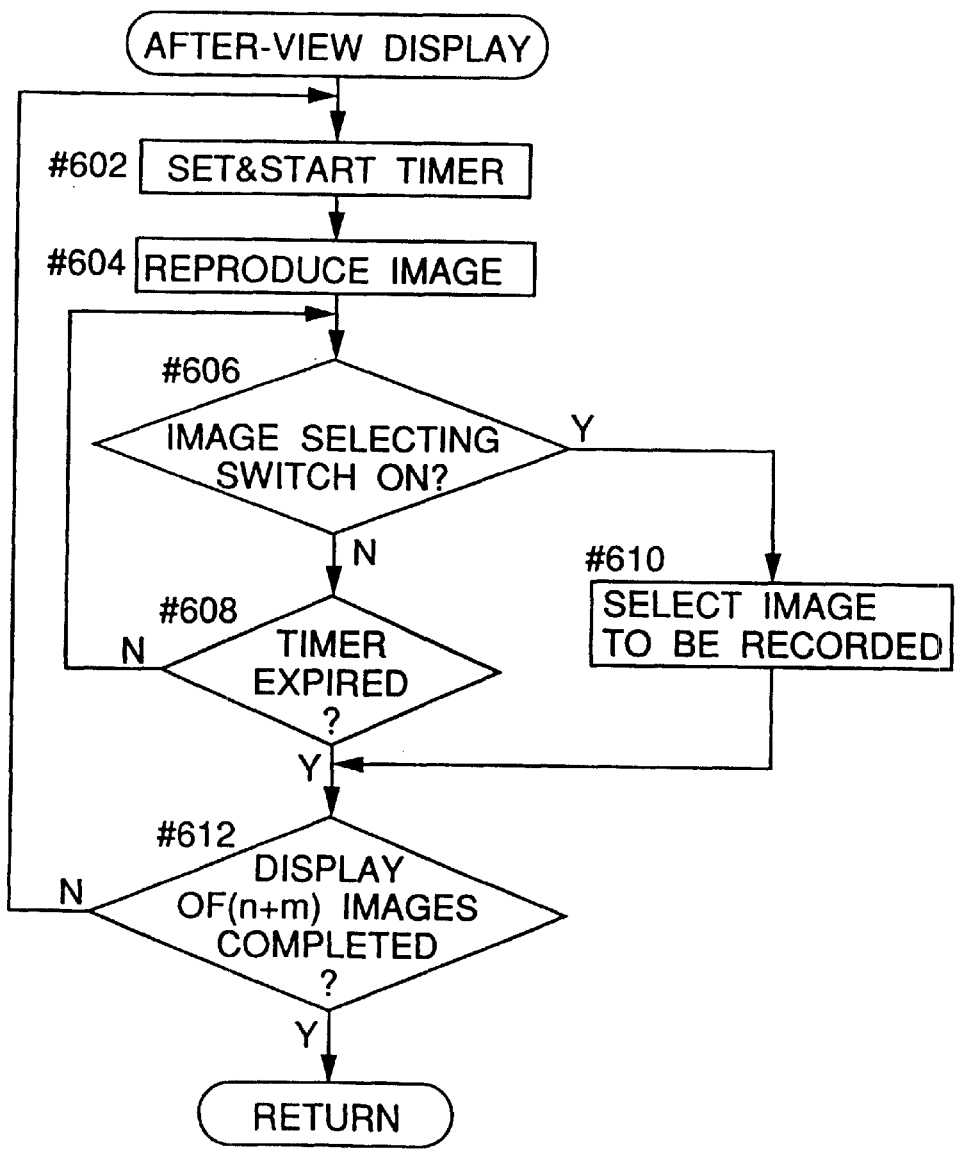
FIG. 9 is a flowchart showing the flow of a processing to select images to be recorded onto a recording medium in the shutter chance mode.

The flow of a processing to record, of the images stored in the RAM 17, only images selected by the user onto a recording medium is shown in FIG. 9. This processing replaces the after view display of step #248 of FIG. 5. In this processing, in order that the user can determine whether an image is to be recorded or not, all the images stored in the RAM 17 are successively displayed on the LCD 19 and images for which the image selecting switch 47 is operated during the display are selected as images to be recorded.

First, a timer for deciding the image display time is set and started (step #602) and images are read out from the RAM 17 and displayed on the LCD 19 (step #604). At this time, images are read out from older ones. Then, whether the image selecting switch 47 is operated or not is determined (step #606). When the image selecting switch 47 is not operated, the determination is repeated until the timer expires (step #608). When the image selecting switch 47 is operated, it is stored that the image being displayed is to be recorded (step #610).

Then, it is determined whether display of all of the (n+m) images has been completed or not (step #612). When there is an image that has not been displayed yet, the process returns to step #602 to repeat the processing. Thus, all the images are displayed and images to be recorded are selected. The user can select any number of images and has discretion to record none of the taken images and to record all the images. After this processing, at step #250 of FIG. 5, the selected images are compressed and recorded.

As described above, in the electronic still camera 1, since the number of recorded images and the photographic time interval in the shutter chance mode are variable, the shutter chance is surely captured and the recording medium is efficiently used. The function of recording only the images selected by the user greatly improves the use efficiency of the recording medium.

Obviously, many modifications and variations of the present invention are possible in light of the above teachings. It is therefore to be understood that within the scope of the appended claims, the invention may be practiced other than as specifically described.

What is claimed is:

1. An electronic still camera comprising:
    an imaging apparatus for photographing a subject and generating image data of the subject;
    an operation member for providing an instruction to start photographing;
    a first memory for storing therein image data of an image taken by said imaging apparatus;
    a selector for selecting any one of image data of a plurality of frames stored in said first memory;
    a second memory for storing therein image data of an image frame selected by said selector; and
    a controller for executing a pre-photographing control in which prior to the instruction to start photographing provided by said operation member, said imaging apparatus is caused to photograph the subject and image data are stored in said first memory, and a post-photographing control in which in response to the instruction to start photographing provided by said operation member, said imaging apparatus is caused to photograph the subject and image data are stored in said first memory,
    wherein said selector selects any one of images of a plurality of frames taken through said pre-photographing control and said post-photographing control executed by said controller.

2. An electronic still camera as claimed in claim 1, wherein said first memory is an internal memory incorporated in a body of said electronic still camera for temporarily storing image data therein, and wherein said second memory is an external memory.

3. An electronic still camera as claimed in claim 2, wherein said external memory is detachably attached to the electronic still camera.

4. An electronic still camera as claimed in claim 2, wherein said external memory is provided separately from an electronic still camera body and connected to the electronic still camera body through an interface.

5. An electronic still camera as claimed in claim 1, wherein said operation member includes a release button, and
    wherein said pre-photographing control is executed in response to a signal outputted by half depression of said release button and said post-photographing control is executed in response to a signal outputted by full depression of said release button.

6. An electronic still camera as claimed in claim 1, wherein in said pre-photographing control, photographing is repeatedly performed in a predetermined cycle.

7. An electronic still camera as claimed in claim 1, wherein in said post-photographing control, photographing is repeatedly performed in a predetermined cycle.

8. An electronic still camera as claimed in claim 1, wherein in said pre-photographing control, image data of a predetermined number of frames are stored in said first memory by erasing image data obtained in an earliest photographing from said first memory and writing image data obtained in a latest photographing into said first memory.

9. An electronic still camera as claimed in claim 1, wherein in said post-photographing control, image data of a predetermined number of frames are stored in said first memory by erasing image data obtained in an earliest photographing from said first memory and writing image data obtained in a latest photographing into said first memory.

10. An electronic still camera as claimed in claim 1, further comprising a display apparatus for displaying image data of a plurality of frames obtained in said pre-photographing control and said post-photographing control and stored in said first memory,
    wherein said selector selects an image based on image data display provided by said display apparatus.

11. An electronic still camera as claimed in claim 10, wherein said display apparatus sequentially displays said image data of said plurality of frames frame by frame.

12. An electronic still camera comprising:
    an imaging apparatus for photographing a subject and generating image data of the subject;
    an operation member for providing an instruction to start photographing;
    a memory for storing therein image data of an image taken by said imaging apparatus;
    a controller for executing a pre-photographing control in which prior to the instruction to start photographing provided by said operation member, said imaging apparatus is caused to repeatedly photograph the subject in a predetermined photographic cycle and image data are stored in said memory, and a post photographing control in which in response to the instruction to start photographing provided by said operation member, said imaging apparatus is caused to photograph the subject and image data are stored; and
    wherein said electronic still camera is capable of photographing in a plurality of photographic modes which have a predetermined photographic cycle, and wherein said predetermined photographic cycle is set in accordance with a selected photographic mode.

13. An electronic still camera as claimed in claim 12, wherein said plurality of photographic modes include a normal mode in which image data obtained in photographing are compressed at a high compression rate and a fine mode in which image data obtained in photographing are compressed at a low compression rate, and wherein the photographic cycle set in said normal mode is shorter than the photographic cycle set in said fine mode.

14. An electronic still camera as claimed in claim 12, wherein said plurality of photographic modes include a normal photographing mode and a sport mode suitable for photographing of a fast moving subject, and wherein the photographic cycle set in said normal photographing mode is longer than the photographic cycle set in said sport mode.

15. An electronic still camera as claimed in claim 12, wherein said plurality of photographic modes include a normal photographing mode and a macro mode suitable for photographing of a close subject, and wherein the photographic cycle set in said normal photographing mode is shorter than the photographic cycle set in said macro mode.

16. An electronic still camera as claimed in claim 12, wherein said controller causes said imaging apparatus to repeatedly perform photographing in said predetermined photographic cycle even in said post-photographing control.

17. An electronic still camera as claimed in claim 12, wherein said operation member includes a release button, and
    wherein said pre-photographing control is executed in response to a signal outputted by half depression of said release button and said post-photographing control is executed in response to a signal outputted by full depression of said release button.

18. An electronic still camera as claimed in claim 12, further comprising:
a selector for selecting any one of image data of a plurality of frames stored in said first memory.

19. An electronic still camera comprising:
an imaging apparatus for photographing a subject and generating image data of the subject;
an operation member for providing an instruction to start photographing;
a memory for storing therein image data of an image taken by said imaging apparatus;
a controller for causing said imaging apparatus to repeatedly perform photographing in a predetermined cycle over a predetermined photographic period spanning before and after the instruction to start photographing is provided by said operation member; and
wherein said electronic still camera is capable of photographing in a plurality of photographic modes which have a predetermined photographic cycle, and wherein said predetermined photographic cycle is set in accordance with a selected photographic mode.

20. An electronic still camera as claimed in claim 19, wherein said plurality of photographic modes include a normal mode in which image data obtained in photographing are compressed at a high compression rate and a fine mode in which image data obtained in photographing are compressed at a low compression rate, and wherein the photographic cycle set in said normal mode is shorter than the photographic cycle set in said fine mode.

21. An electronic still camera as claimed in claim 19, wherein said plurality of photographic modes include a normal photographing mode and a sport mode suitable for photographing of a fast moving subject, and wherein the photographic cycle set in said normal photographing mode is longer than the photographic cycle set in said sport mode.

22. An electronic still camera as claimed in claim 19, wherein said plurality of photographic modes include a normal photographing mode and a macro mode suitable for photographing of a close subject, and wherein the photographic cycle set in said normal photographing mode is shorter than the photographic cycle set in said macro mode.

23. An electronic still camera as claimed in claim 19, further comprising:
a selector for selecting any one of image data of a plurality of frames stored in said first memory.

24. An electronic still camera comprising:
an imaging apparatus for photographing a subject and generating image data of the subject;
an operation member for providing an instruction to start photographing;
a memory for storing therein image data of an image taken by said imaging apparatus;
a controller for executing a pre-photographing control in which prior to the instruction to start photographing provided by said operation member, said imaging apparatus is caused to repeatedly photograph the subject and image data of a predetermined number of frames are stored in said memory, and a post-photographing control in which in response to the instruction to start photographing provided by said operation member, said imaging apparatus is caused to photograph the subject and image data are stored; and
wherein said electronic still camera is capable of photographing in a plurality of photographic modes which have a predetermined number of frames, and wherein said predetermined number of frames is set in accordance with a selected photographic mode.

25. An electronic still camera as claimed in claim 24, wherein said plurality of photographic modes include a normal mode in which image data obtained in photographing are compressed at a high compression rate and a fine mode in which image data obtained in photographing are compressed at a low compression rate, and wherein the predetermined number set in said normal mode is greater than the predetermined number set in said fine mode.

26. An electronic still camera as claimed in claim 24, wherein said plurality of photographic modes include a normal photographing mode and a sport mode suitable for photographing of a fast moving subject, and wherein the predetermined number set in said normal photographing mode is smaller than the predetermined number set in said sport mode.

27. An electronic still camera as claimed in claim 24, wherein said plurality of photographic modes include a normal photographing mode and a macro mode suitable for photographing of a close subject, and wherein the predetermined number set in said normal photographing mode is greater than the predetermined number set in said macro mode.

28. An electronic still camera as claimed in claim 24, wherein said plurality of photographic modes include a first photographic mode using as said memory a memory detachably attached to a body of said electronic still camera and a second photographic mode using as said memory an external memory being separate from the body of said electronic still camera and connected to the body of said electronic still camera through an interface, and wherein the predetermined number set in said first photographic mode is smaller than the predetermined number set in said second photographic mode.

29. An electronic still camera as claimed in claim 24, further comprising:
a selector for selecting any one of image data of a plurality of frames stored in said first memory.

30. An electronic still camera comprising:
an imaging apparatus for photographing a subject and generating image data of the subject;
an operation member for providing an instruction to start photographing;
a memory for storing therein image data of an image taken by said imaging apparatus; and
a controller for causing said imaging apparatus to repeatedly perform photographing over a predetermined photographing period spanning before and after the instruction to start photographing is provided by said operation member, said controller storing image data of a predetermined number of frames in said memory; and
wherein said electronic still camera is capable of photographing in a plurality of photographic modes which have a predetermined number of frames, and wherein said predetermined number of frames is set in accordance with a selected photographic mode.

31. An electronic still camera as claimed in claim 30, wherein said plurality of photographic modes include a normal mode in which image data obtained in photographing are compressed at a high compression rate and a fine mode in which image data obtained in photographing are compressed at a low compression rate, and wherein the predetermined number set in said normal mode is greater than the predetermined number set in said fine mode.

32. An electronic still camera as claimed in claim 30, wherein said plurality of photographic modes include a normal photographing mode and a sport mode suitable for photographing of a fast moving subject, and wherein the predetermined number set in said normal photographing mode is smaller than the predetermined number set in said sport mode.

33. An electronic still camera as claimed in claim 30, wherein said plurality of photographic modes include a normal photographing mode and a macro mode suitable for photographing of a close subject, and wherein the predetermined number set in said normal photographing mode is greater than the predetermined number set in said macro mode.

34. An electronic still camera as claimed in claim 30, wherein said plurality of photographic modes include a first photographic mode using as said memory a memory detachably attached to a body of said electronic still camera and a second photographic mode using as said memory an external memory being separate from the body of said electronic still camera and connected to the body of said electronic still camera through an interface, and wherein the predetermined number set in said first photographic mode is smaller than the predetermined number set in said second photographic mode.

35. An electronic still camera as claimed in claim 30, further comprising:

a selector for selecting any one of image data of a plurality of frames stored in said first memory.

* * * * *